UNITED STATES PATENT OFFICE.

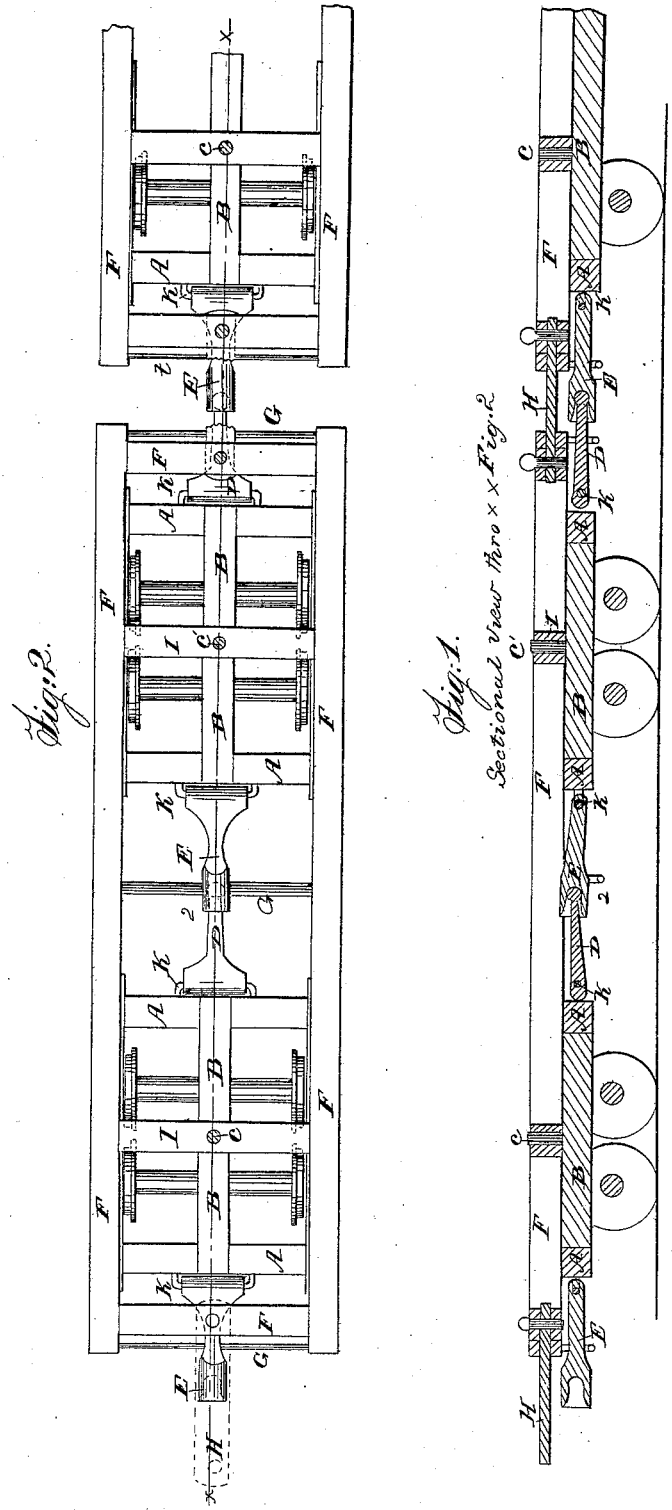

WILLIAM NEBINGER, OF SHARPSBURG, MARYLAND.

RUNNING-GEAR OF RAILROAD-CARS.

Specification of Letters Patent No. 8,451, dated October 21, 1851.

*To all whom it may concern:*

Be it known that I, WILLIAM NEBINGER, of Sharpsburg, in the county of Washington and State of Maryland, have invented a new and useful Improvement in Railroad Trucks, by which the safety of passengers and the preservation of the track is secured; and I do hereby declare that the following is a full, clear, and exact description of the construction and operation of the same, reference being had to the annexed drawings, making a part of this specification.

Figure 1 is a vertical longitudinal section at the line $x\ x$ of Fig. 2. Fig. 2 is a horizontal view or plan.

The peculiar characteristic of this improvement is in the construction and combination of a jointed perch or vibratory beam, placed on pivots at the center of each truck, which combination constitutes a director of all the trucks in the train, on their reaching the curved portion of the track passed over by the truck under the locomotive; this perch beam is connected with, but not united to the other set of trucks, all working on a pivot journal, in the same manner as the first set, and operated on by a suspended globe joint, admitting of a horizontal and slight vertical movement.

To enable others skilled in the art to make and use my invention, I will proceed to describe its construction and operation.

I construct my truck frame in the ordinary manner, of which A A, Fig. 2, represents the end pieces of the framing. If constructed of wood, that portion B, B, forming a vibratory beam I call the perch, operating on the truck frame in its lateral vibration. Equidistant from the ends of B, B, I place pivot journals C C'. On the ends of the truck frame A A I also place an alternate ball D and socket E forming a joint, and connected with said ends of the perch by a hinge joint K admitting of vertical and horizontal movement, the vertical motion to conform to any inequality of the level of the track, the horizontal movement to the curve. These joints D, E, are prevented from falling, by means of cross bars G G placed under them, united with the frame F, F, upon which the body of the car is constructed, on this bar G slides the socket of the joint, and at the ends of the platform a similar provision is made to suspend each separately. It will be borne in mind that this joint D, E, is not intended as one of traction, nor does it dispense with the ordinary coupling bar H Fig. 2.

F, F, F, F, represent the two sides and ends of the framing of the body of a passenger car. At a suitable distance is a point equidistant from the center of the coupling bar H (placed over the ball and socket joint D, E) and the center of the frame of the car body is placed cross framing I, I, provided with a suitable bush to receive the fulcrum or pivot bolt C which rises from the crosspiece or perch B B of the truck, by this means allowing the perch B B thus connected to vibrate and shift the position of the first truck in the train. On the locomotive (also provided with a stem and ball fitting in E) reaching a curve, and thus through the instrumentality of this jointed perch operate throughout the whole train, that portion of the perch forming the stem and socket E passes beyond the front end of the platform of the car body, and measures exactly half the length of the coupling bar H attached to the locomotive, the alternate or rear end of the platform is provided with a stem carrying the ball D. By this means the equal centering of all the train is kept up; not only considered as single trucks, or in pairs as used under passenger cars, where double trucks of four wheels each are used, but where a whole train is taken into consideration. The distance between all the points are equal, to wit, from the center of the first coupling bar H, to the center or pivot C on which the first truck turns, or that distance compared with that, to the center of the ball and socket D E under the center of the passenger car at Fig. 2. From this point 2 to the pivot C' of the second set of trucks and throughout the whole train all the portions of the perch are equal in their lateral leverage, and accordingly the action of the locomotive on the first lever, will regulate the movement, of all, when turning the curve on the rail, throwing into position each separate truck, as it passes a point on the track where the curve commences, by the jointed lever or perch under the locomotive operating on all the others. This mode of connecting the trucks under the cars, obviates in great degree the swaying or oscillating motion of the cars, in addition to the security of passengers, and wear of the rails, by the flanges being prevented from touching the rails, or the cars in the rear thrown off the track, by the flanges of the wheels rising on the rail in straight portions thereof, by the parallelism of the wheels on each side being preserved by the director or bar.

What I claim as my invention and desire to secure by Letters Patent is—

The employment of the bar B B and ball and socket joint D, E, attached to the ends of B B with a hinge in combination with the pivot C on the truck frame for directing and turning said frames (but not drawing the train by said ball and socket joint as I do not dispense with the ordinary traction or coupling bar H) and thus bring the axis of each truck, coincident with the radii of the curve of the track and lead the whole train over any point on the track previously passed by the locomotive, without requiring the action or aid of the flanges on any of the wheels except those on the locomotive, thus preventing the abrasion or wear of the rails and liability of the train being thrown off.

In testimony whereof I have hereunto signed my name before two subscribing witnesses.

W. NEBINGER.

Witnesses:
JOHN F. CLARK,
A. E. H. JOHNSON.